US012675988B2

(12) United States Patent
Sarvesh et al.

(10) Patent No.: US 12,675,988 B2
(45) Date of Patent: Jul. 7, 2026

(54) ON-DEVICE INFERENCE METHOD FOR MULTI-FRAME PROCESSING IN A NEURAL NETWORK

(71) Applicant: SAMSUNG ELECTRONICS CO., LTD., Suwon-si (KR)

(72) Inventors: Sarvesh, Bengaluru (IN); Kinsuk Das, Bengaluru (IN); Raj Narayana Gadde, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/538,723

(22) Filed: Dec. 13, 2023

(65) Prior Publication Data

US 2024/0112456 A1     Apr. 4, 2024

Related U.S. Application Data

(63) Continuation of application No. PCT/KR2023/011247, filed on Aug. 1, 2023.

(30) Foreign Application Priority Data

Aug. 1, 2022    (IN) ............................. 202241044063
Jul. 10, 2023    (IN) ............................. 202241044063

(51) Int. Cl.
*G06V 10/82*      (2022.01)
*G06T 3/40*      (2006.01)
*G06V 10/771*      (2022.01)

(52) U.S. Cl.
CPC ................ *G06V 10/82* (2022.01); *G06T 3/40* (2013.01); *G06V 10/771* (2022.01)

(58) Field of Classification Search
None
See application file for complete search history.

(56) References Cited

U.S. PATENT DOCUMENTS 10,318,842 B1    6/2019   Kim et al.
11,183,178 B2   11/2021   Khalil et al.
(Continued)

FOREIGN PATENT DOCUMENTS

CN          110852961 A    2/2020
KR   10-2021-0056899 A    5/2021
KR   10-2022-0088277 A    6/2022

OTHER PUBLICATIONS

Su et al "Deep Video Deblurring for Hand-held Cameras" CVF (Year: 2017).*
(Continued)

*Primary Examiner* — Leon Flores
(74) *Attorney, Agent, or Firm* — Sughrue Mion, PLLC

(57) ABSTRACT

A method for optimizing multi-frame processing model of a neural network includes: receiving a plurality of input frames by a processing engine that is configured to execute a multi frame processing model, the multi frame processing model including a plurality of convolution layers; selecting a pre-determined number of frames from the received plurality of frames for processing by the plurality of convolution layers; determining, as a sequence of frames, at least a preceding frame and a plurality of following frames amongst the selected pre-determined number of frames; removing the preceding frame by processing the sequence of frames using a plurality of filters in the multi frame processing model; and concatenating the plurality of following frames in an order, to the plurality of input frames for subsequent receiving by the multi frame processing model.

18 Claims, 12 Drawing Sheets

(56) References Cited

U.S. PATENT DOCUMENTS

| | | | |
|---|---|---|---|
| 11,288,515 | B2 | 3/2022 | Aliamiri et al. |
| 11,775,827 | B2 | 10/2023 | Aliamiri et al. |
| 2019/0251383 | A1 | 8/2019 | Senay et al. |
| 2019/0332889 | A1 | 10/2019 | Courtney et al. |
| 2020/0086879 | A1 | 3/2020 | Lakshmi Narayanan et al. |
| 2020/0349682 | A1 | 11/2020 | Mayol Cuevas et al. |
| 2020/0364834 | A1* | 11/2020 | Ferrés ....................... G06T 5/60 |
| 2021/0117684 | A1 | 4/2021 | Chaudhury et al. |
| 2021/0160530 | A1 | 5/2021 | Watson |
| 2022/0198628 | A1* | 6/2022 | Dinh .................... H04N 19/172 |
| 2022/0207876 | A1 | 6/2022 | Aliamiri et al. |
| 2022/0270209 | A1* | 8/2022 | Mironica ............. G06N 3/0464 |

OTHER PUBLICATIONS

Sajjadi et al "Frame-Recurrent Video Super Resolution" arXiv (Year: 2018).*

Communication dated Nov. 17, 2023, issued by the International Searching Authority in counterpart International Application No. PCT/KR2023/011247 (PCT/ISA/210).

Communication dated Nov. 17, 2023, issued by the International Searching Authority in counterpart International Application No. PCT/KR2023/011247 (PCT/ISA/237).

Communication issued Apr. 8, 2025 by the European Patent Office in European Patent Application No. 23850401.3.

Communication issued May 7, 2025 by the Intellectual Property Office of India in Indian Patent Application No. 202241044063.

Takahashi, Nobuaki et al., "Nonlinear Interpolative Effect of Feedback Template for Image Processing by Discrete-Time Cellular Neural Network", IEEE, 2002, pp. 1942-1945. (4 pages total).

Yilmaz, M. Akin et al., "Effect of Architectures and Training Methods on the Performance of Learned Video Frame Prediction", arXiv:2008.06106v1 [cs.CV], Aug. 13, 2020. (5 pages total).

Dandan Ding et al., "Neural Reference Synthesis for Inter Frame Coding", IEEE Transactions on Image Processing , vol. 31, 2022 (published Dec. 21, 2021), pp. 773-787, DOI: 10.1109/TIP.2021.3134465.

* cited by examiner

FIG. 6

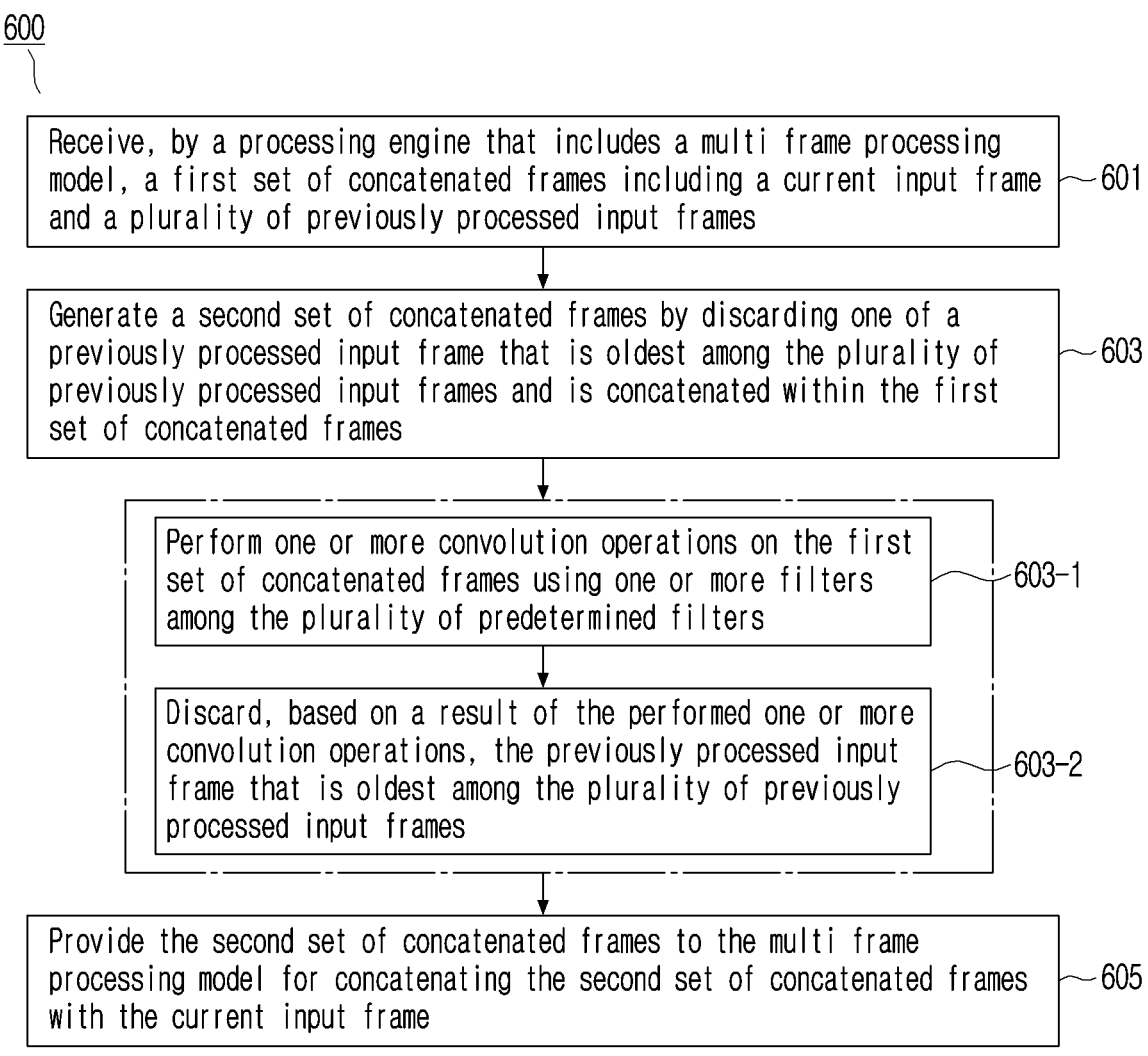

600

Receive, by a processing engine that includes a multi frame processing model, a first set of concatenated frames including a current input frame and a plurality of previously processed input frames —601

Generate a second set of concatenated frames by discarding one of a previously processed input frame that is oldest among the plurality of previously processed input frames and is concatenated within the first set of concatenated frames —603

Perform one or more convolution operations on the first set of concatenated frames using one or more filters among the plurality of predetermined filters —603-1

Discard, based on a result of the performed one or more convolution operations, the previously processed input frame that is oldest among the plurality of previously processed input frames —603-2

Provide the second set of concatenated frames to the multi frame processing model for concatenating the second set of concatenated frames with the current input frame —605

900

901

Number of frames
needed for inference

903

Determine number of
filters in custom
convolution layer

905

Create a matrix of size 1*1*number
of frames needed − 1

907

Initialize created matrix with zeros

911

Weights for custom convolution layer for
the new output to block 711 of Figure 7

909

Are
number of filters
remaining > 0?

No

913

Increase
filter count yes

915

Set (i+1) column of ( i ) filter as 1

ON-DEVICE INFERENCE METHOD FOR MULTI-FRAME PROCESSING IN A NEURAL NETWORK

CROSS-REFERENCE TO RELATED APPLICATION(S)

This application is a continuation application, claiming priority under § 365(c), of an International application No. PCT/KR2023/011247, filed on Aug. 1, 2023, which is based on and claims the benefit of a Indian provisional patent application number 202241044063, filed on Aug. 1, 2022, in the Indian Intellectual Property Office and a Indian complete patent application number 202241044063, filed on Jul. 10, 2023, in the Indian Intellectual Property Office, the disclosure of each of which is incorporated by reference herein in its entirety.

TECHNICAL FIELD

The disclosed embodiments generally relates to image processing, and more particularly to a method for optimizing multi-frame processing model of a neural network for providing fast on-device inference for a multi-frame architecture.

BACKGROUND

Multi-frame architecture refers to a design and a structure of computational models or algorithms that leverage information from multiple frames or a sequence of data. Recurrent Neural Networks (RNNs), Convolutional Neural Networks (CNNs), and multi-frame Deep Neural Networks (DNNs) inference architecture are some examples of the multi-frame architecture. The methodology implemented in the multi-frame architecture may be referred to as multi-frame model.

The multi-frame model is designed to handle and exploit temporal and spatial information across multiple frames for various tasks, such as video processing, image processing, and/or sequential data analysis. Further, the multi-frame model relies on the utilization of multiple frames to extract useful information, like temporal and spatial information, to solve complex problems. Due to the inherent dependency of the multiple frames and corresponding useful information obtained from the multiple frames, the multi-frame processing is more effective than a single-frame processing technique. Consequently, the multi-frame model has found widespread adoption in applications, such as High Dynamic Range (HDR), Noise Removal (NR), Super-Resolution (SR), and low light photography. Further, the multi-frame architecture is also implemented in various electronic devices, such as cameras, video-capturing devices, and/or monitoring devices.

Conventionally, the multi-frame architecture maintains a queue in a buffer based on a number of frames required for inference. Accordingly, the required number of frames are extracted from a sequence of input frames and stored in the buffer by maintaining the queue. The multi-frame architecture processes all the required number of frames in the queue to obtain a result. However, this approach necessitates the processing of all the frames in the queue in higher dimensions with repetitive computations. For example, the multi-frame Deep Neural Network (DNN) inference architecture deploys buffer queuing and a sub-optimal operation in graphs (i.e. models). FIG. 1 illustrates a queuing mechanism in a conventional multi-frame DNN inference architecture, according to a conventional technique. According to the multi-frame DNN inference architecture, frames from the sequence of inputs need to be buffered in a queue before they can be processed. This queuing allows for sequential extraction and processing of frames in a correct order. For example, in the exemplary queuing mechanism 100 depicted in FIG. 1, consider that Frame 1 to Frame n is inserted into a queue 101. Further, consider that during the first processing cycle, frame 1 to frame 5 are considered for processing in the queue 101. Hence, the frame 1 to frame 5 are extracted from the queue 101 and given to a multi-frame DNN inference model 103 for processing. Thereafter, during a next processing cycle, consider that the frame 2 to frame 6 are considered for processing and given to the multi-frame DNN model 103. However, during these two processing cycles, the frame 2 to frame 5 are common, hence the frame 2 to frame 5 are processed again. This leads to redundant processing of frames between two processing cycles. This redundant operation further introduces delays in the overall process. Accordingly, the buffering process and the extraction process consumes unnecessary computation and device cycles. As the buffering process and the extraction process involves data bus, it leads to a consumption of extra power cycles in the electronic device. Accordingly, in power and resource constraint electronic devices (e.g., the camera), an inference architecture, that is sub-optimal, can result in inferior performance and higher power usage. This further impacts the overall user experience of the electronic device. Thus, there is a need for a solution that helps to avoid redundant computations.

FIG. 2 illustrates a first layer processing in a higher dimension in the conventional multi-frame DNN inference architecture, according to a conventional technique. The multi-frame DNN inference often involves the processing of data in higher dimensions, such as handling spatio-temporal information. For example, in a first layer processing 211, a concatenation (concat) 201 operation is performed in higher dimensions width (w) and height (h) that are large for high-resolution applications such as High Definition (HD), Full High definition (FHD), Ultra High Definition (4K), and application with resolution 2048×1080 (2K). The output is then processed by successive layers which also process the output in higher dimensions of width (w) and height (h). For example, as shown in FIG. 2, output_1 from the concat 201 is processed by the convolution (conv) layers 203. The first operation in the multi-frame DNN inference model 103 is performed in the higher dimension (height/width). However, this is sub-optimal for on-device computational elements, like Digital Signal Processing (DSP)/Neural Processing Unit (NPU), which are primarily optimized to process in a higher channel than the higher dimension. Hence, such architecture is sub-optimal for on-device computational elements. This largely affects the performance of the on-device computational elements. Accordingly, there is a need to process the combined information in lower dimensions and higher channels for better performance of the on-device computational elements.

FIG. 3 illustrates pre-processing and post-processing in the multi-frame DNN inference architecture with pipeline execution, according to a conventional technique. The data used in multi-frame DNN inference may need to be pre-processed or post-processed to ensure that it is in the expected format for the neural network. The pre-processing and post-processing steps can involve data conversion, resizing, normalization, quantization, dequantization, or other transformations to prepare the frames or sequences for input into the multi-frame DNN inference model. These additional operations add computational overhead and may impact the overall efficiency of the inference process. For example, as can be seen in FIG. 3, input frames, i.e., frame 1 to frame n are pre-processed by quantizing at step 301. The quantized frames are then processed at step 303 by performing a series of operations involving concatenation and convolution operations. Thereafter, at step 305, the processed output is further dequantized to convert the frames into the original form. Accordingly, these pre-processing and post-processing operations take extra computational cycles which result in high power and poor performance of the electronic device. Accordingly, there is a need to eliminate aforesaid pre-processing and post-processing steps.

Thus, it is desired to address at least the above-mentioned disadvantages or other shortcomings or at least provide a useful alternative for optimizing multi-frame processing in the multi-frame architecture.

SUMMARY

The disclosed embodiments are provided to introduce a selection of concepts, in a simplified format, which is further described in the detailed description. This summary is neither intended to identify key or essential concepts nor is it intended for determining the scope of the disclosed embodiments.

A method for optimizing multi-frame processing model of a neural network may include: receiving a plurality of input frames by a processing engine that is configured to execute a multi frame processing model, the multi frame processing model including a plurality of convolution layers; selecting a pre-determined number of frames from the received plurality of frames for processing by the plurality of convolution layers; determining, as a sequence of frames, at least a preceding frame and a plurality of following frames amongst the selected pre-determined number of frames; removing the preceding frame by processing the sequence of frames using a plurality of filters in the multi frame processing model; and concatenating the plurality of following frames in an order, to the plurality of input frames for subsequent receiving by the multi frame processing model.

The processing engine may be a component of the neural network that is at least one of a recurrent neural network (RNN), a convolutional neural network (CNN), or a deep neural networks (DNN).

A method for optimizing multi-frame processing model of a neural network may include: receiving a first set of concatenated frames and a plurality of previously processed input frames by a processing engine that is configured to execute a multi frame processing model, the first set of concatenated frames including a current input frame; generating a second set of concatenated frames by discarding an oldest previously processed input frame of the plurality of previously processed input frames that is concatenated within the first set of concatenated frames; and providing the second set of concatenated frames to the multi frame processing model for concatenating the second set of concatenated frames with the current input frame.

The multi frame processing model may include a plurality of predetermined filters. The generating the second set of concatenated frames may include: performing one or more convolution operations on the first set of concatenated frames using one or more filters of the plurality of predetermined filters; and discarding the oldest previously processed input frame based on a result of the performing the one or more convolution operations.

The one or more convolution operations may be performed using all of the plurality of predetermined filters.

A filter weight of each of the plurality of predetermined filters may correspond to a dummy weight. The dummy weight may be associated with each of the plurality of predetermined filters via a dummy weight interleaving method.

The method may further include: downsampling the current input frame and each of the second set of concatenated frames to a specific resolution; and generating a third set of concatenated frames by concatenating the down sampled current input frame and the down sampled second set of concatenated frames.

The downsampling the current input frame to the specific resolution may include performing a convolution on the current input frame using a filter weight of the one or more filters.

The multi frame processing model may further include a plurality of convolution layers. The method may further include adjusting a weight of a convolution layer of the plurality of convolution layers that receives the first set of concatenated frames based on a change in the specific resolution and a change in an input channel.

The multi frame processing model may include a clipping layer. The method may further include: determining a clipping range of the clipping layer based on a bit depth and an input range associated with one or more input frames within the second set of concatenated frames; and limiting one or more outputs of the processing engine to a pre-determined range based on the determined clipping range of the clipping layer.

The processing engine may be a component of the neural network that is at least one of a recurrent neural network (RNN), a convolutional neural network (CNN), or a deep neural networks (DNN).

An apparatus for optimizing multi-frame processing model of a neural network may include: a processing engine that is configured to execute a multi frame processing model. The processing engine being further configured to: receive a first set of concatenated frames and a plurality of previously processed input frames, the first set of concatenated frames including a current input frame; generate a second set of concatenated frames by discarding an oldest previously processed input frame of the plurality of previously processed input frames that is concatenated within the first set of concatenated frames; and provide the second set of concatenated frames to the multi frame processing model for concatenating the second set of concatenated frames with the current input frame.

The multi frame processing model may include a plurality of predetermined filters. The processing engine being configured to generate the second set of concatenated frames includes being configured to: perform one or more convolution operations on the first set of concatenated frames using one or more filters of the plurality of predetermined filters; and discard the oldest previously processed input frame based on a result of the performed one or more convolution operations.

The one or more convolution operations may be performed using all of the plurality of predetermined filters.

A filter weight of each of the plurality of predetermined filters may correspond to a dummy weight. The dummy weight may be associated with each of the plurality of predetermined filters via a dummy weight interleaving method.

The processing engine may be further configured to: downsample the current input frame and each of the second set of concatenated frames to a specific resolution; and generate a third set of concatenated frames by concatenating the down sampled current input frame and the down sampled second set of concatenated frames.

The processing engine being configured to downsample the current input frame to the specific resolution includes being configured to perform a convolution on the current input frame using a filter weight of the one or more filters.

The multi frame processing model may further include a plurality of convolution layers. The processing engine may be further configured to adjust a weight of a convolution layer of the plurality of convolution layers that receives the first set of concatenated frames based on a change in the specific resolution and a change in an input channel.

The multi frame processing model may include a clipping layer. The processing engine may be further configured to: determine a clipping range of the clipping layer based on a bit depth and an input range associated with one or more input frames within the second set of concatenated frames; and limit one or more outputs of the processing engine to a pre-determined range based on the determined clipping range of the clipping layer.

The processing engine may be a component of the neural network that is at least one of a recurrent neural network (RNN), a convolutional neural network (CNN), or a deep neural networks (DNN).

To further clarify the advantages and features of the disclosed embodiments, a more particular description will be rendered by reference to specific embodiments thereof, which are illustrated in the appended drawings. It is appreciated that these drawings depict only typical embodiments and are therefore not to be considered limiting of its scope. The disclosed embodiments will be described and explained with additional specificity and detail in the accompanying drawings.

BRIEF DESCRIPTION OF THE DRAWINGS

These and other features, aspects, and advantages of the disclosed embodiments will become better understood when the following detailed description is read with reference to the accompanying drawings in which like characters represent like parts throughout the drawings, wherein:

FIG. 6 illustrates a flow chart for optimizing the multi-frame processing model, according to an embodiment;

6

Figure 9:
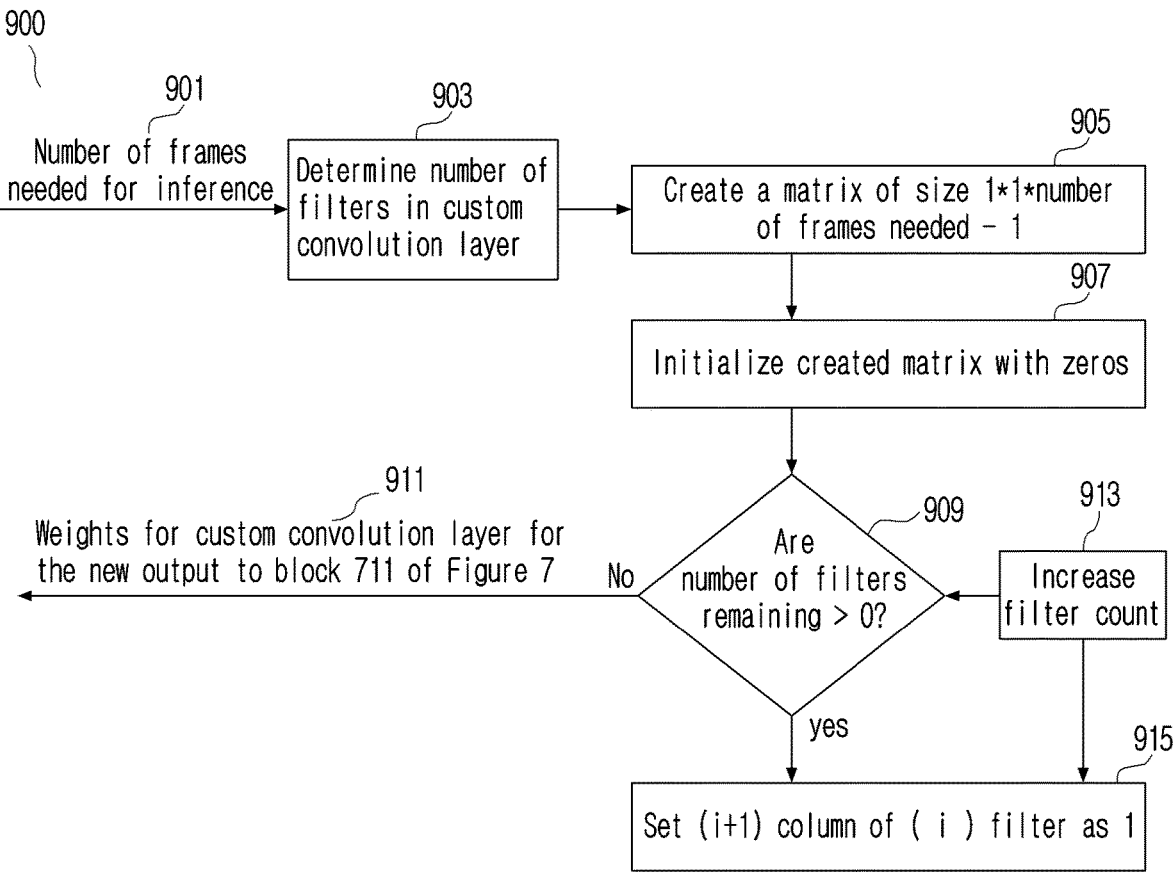
Figure 10:
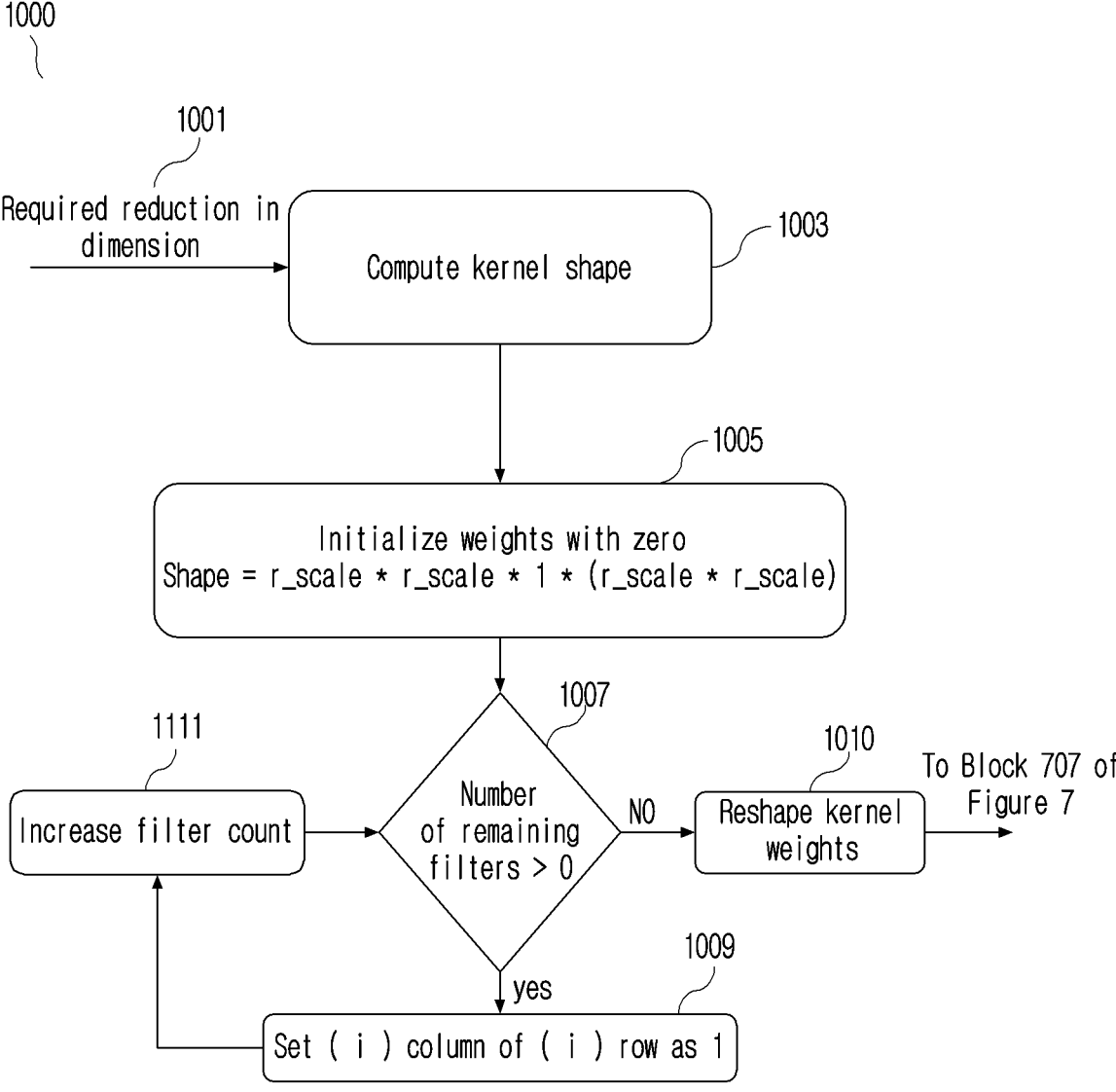
Figure 11:
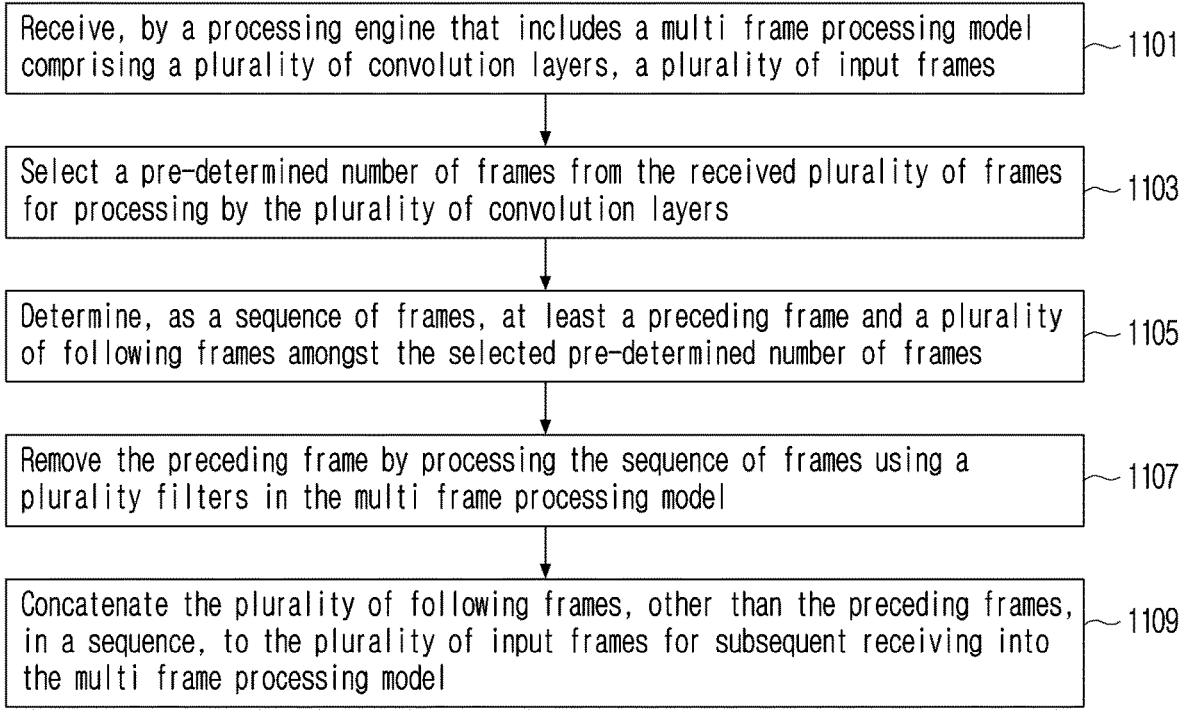
Figure 12:
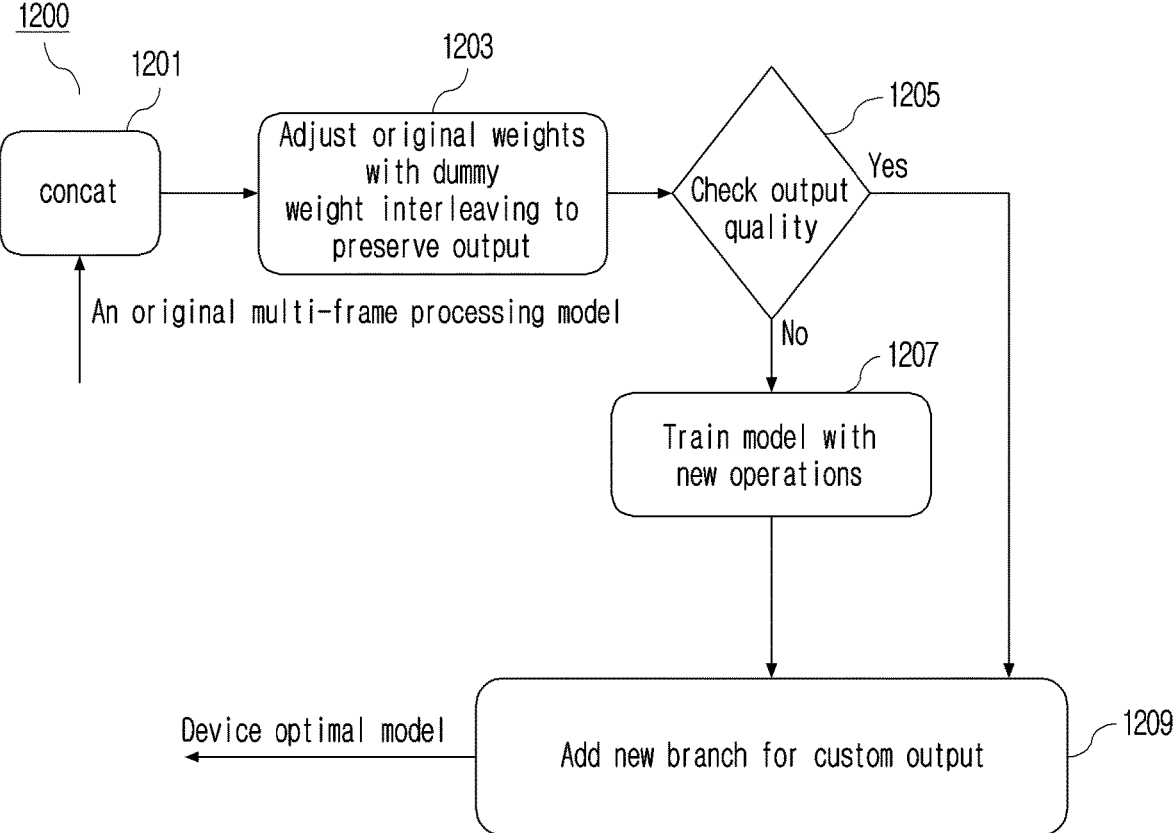

FIG. 9 illustrates a flow diagram for setting filter weights and generation of custom weights, according to an embodiment;

FIG. 10 illustrates a custom kernel generation for downsampling concatenated frames and a current input frame, according to an embodiment;

FIG. 11 illustrates a flow chart for optimizing the multi-frame processing model, according to an embodiment; and FIG. 12 illustrates a conversion of an original multi-frame processing model to device optimized model using the method of FIG. 6, according to an embodiment.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of the disclosed embodiments. Furthermore, in terms of the construction of the device, one or more components of the device may have been represented in the drawings by conventional symbols, and the drawings may show only those specific details that are pertinent to understanding the disclosed embodiments so as not to obscure the drawings with details that will be readily apparent to those of ordinary skill in the art having the benefit of the description herein.

DETAILED DESCRIPTION

For the purpose of promoting an understanding of the principles of the disclosed embodiments, reference will now be made to the embodiment illustrated in the drawings and specific language will be used to describe the same. It will nevertheless be understood that no limitation of the scope of the disclosed embodiments are thereby intended, such alterations and further modifications in the illustrated system, and such further applications of the principles of the disclosed embodiments as illustrated therein being contemplated as would normally occur to one skilled in the art to which the disclosed embodiments relate.

It will be understood by those skilled in the art that the foregoing general description and the following detailed description are explanatory of the disclosed embodiments and are not intended to be restrictive thereof.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as, for example, units or modules, are physically implemented by analog or digital circuits such as logic gates, integrated circuits, microprocessors, microcontrollers, memory circuits, passive electronic components, active electronic components, optical components, and/or hardwired circuits, and may optionally be driven by firmware and software. The circuits may, for example, be embodied in one or more semiconductor chips, or on substrate supports such as printed circuit boards. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosed embodiments. Likewise, the blocks of the embodiments may be physically combined into more complex blocks without departing from the scope of the disclosed embodiments.

The accompanying drawings are used to help easily understand various technical features and it should be understood that the embodiments presented herein are not limited by the accompanying drawings. As such, the present disclosed embodiments should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terms "neural network(s)", and "neural network layer(s)" "neural network" are used interchangeably. The terms "multi-frame model", "multi-frame DNN model", "multi frame model" "multi-frame processing model", multi-frame processing engine" are used interchangeably.

Referring now to the drawings, and more particularly to FIGS. 4 to 12, where similar reference characters denote corresponding features consistently throughout the figures, there are shown preferred embodiments.

Figure 1:
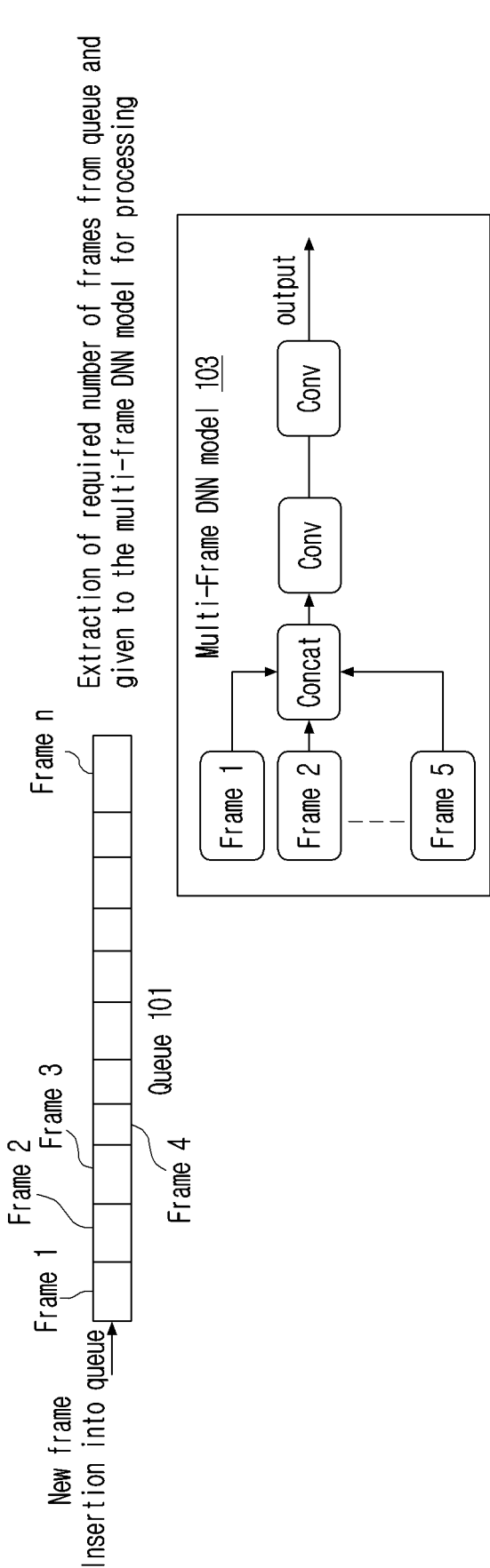
FIG. 1 illustrates a queuing mechanism in a conventional multi-frame DNN inference architecture, according to a conventional technique.
Figure 2:
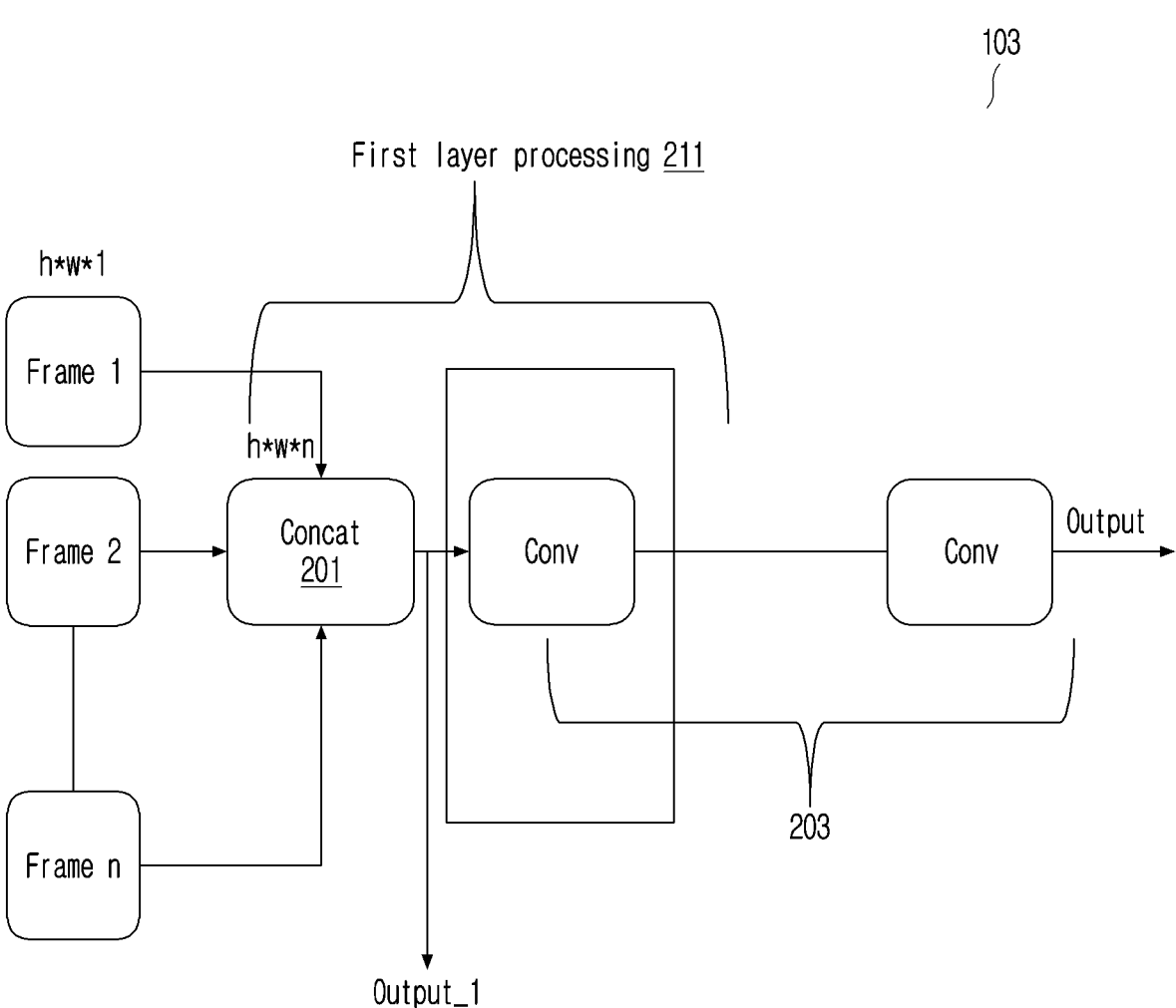
FIG. 2 illustrates a first processing layer in a higher dimension in the conventional multi-frame DNN inference architecture, according to a conventional technique.
Figure 3:
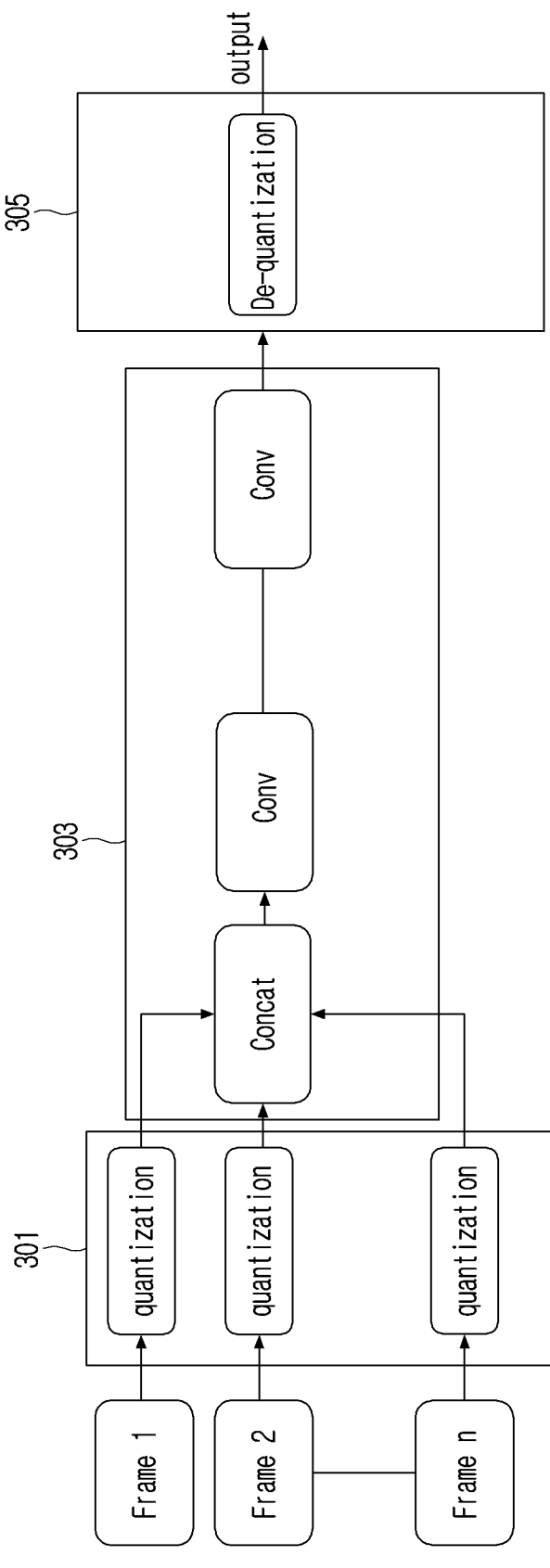
FIG. 3 illustrates pre-processing and post-processing in the multi-frame DNN inference architecture with pipeline execution, according to a conventional technique.
Figure 4:
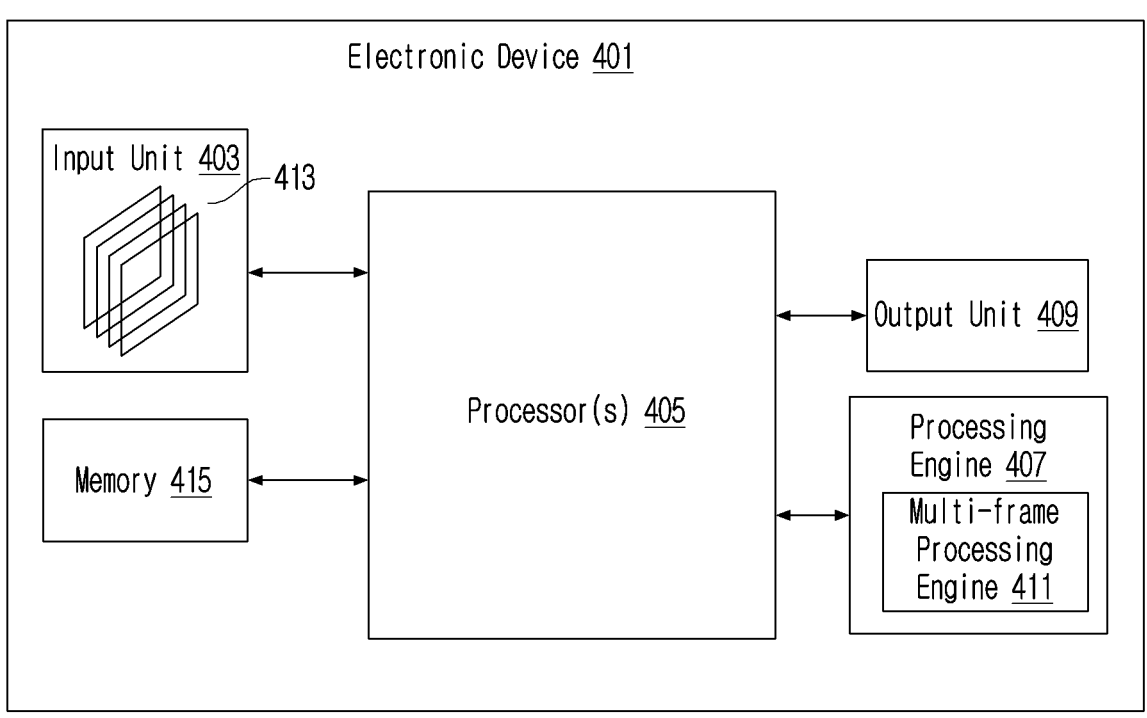
FIG. 4 illustrates a block diagram of an electronic device 401 for optimizing multi-frame processing model of a neural network, according to an embodiment.

FIG. 4 illustrates a block diagram of an electronic device 401 for optimizing a multi-frame processing model of a neural network, according to an embodiment as disclosed herein. Examples of the electronic device 401 may include but are not limited to, a smartphone, a tablet computer, a Personal Digital Assistance (PDA), a camera, a monitoring device, an image capturing device, a video recording device, or any other electronic device capable of processing images or video data.

The electronic device 401 may include an input unit 403, a processor(s) 405, an output unit 409, and a memory 415 coupled with each other. The processor(s) 405 is coupled with a processing engine 407. The processing engine 407 includes a multi-frame processing engine 411. A detailed explanation of each of the components as mentioned above will be explained in the forthcoming paragraphs.

The input unit 403 may be configured to receive a plurality of frames. In a non-limiting example, the plurality of frames 413 may correspond to multiple frames from images or video data. The plurality of frames may be provided as an input to the muti-frame processing engine 411 of the processing engine 407. The plurality of frames may be alternatively referred to as frames without deviating from the scope of the disclosed embodiments.

The processor 405 operates with the memory 415, the processing engine 407, and the output unit 409. The processor 405 may be a single processing unit or a number of units, all of which could include multiple computing units. The processor 405 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 405 is configured to fetch and execute computer-readable instructions and data stored in the memory 415. The processor 120 may include one or a plurality of processors, maybe a general-purpose processor, such as a central processing unit (CPU), an application processor (AP), a graphics-only processing unit such as a graphics processing unit (GPU), a visual processing unit (VPU), and/or an Artificial intelligence (AI) dedicated processor such as a neural processing unit (NPU).

The processing engine 407 is implemented by processing circuitry such as logic gates, integrated circuits, microprocessors, microcontrollers, memory circuits, passive electronic components, active electronic components, optical components, and/or hardwired circuits, and may optionally be driven by firmware. The circuits may, for example, be embodied in one or more semiconductor chips, or on substrate supports such as printed circuit boards.

The memory 415 may store instructions to be executed by the processor 405 for optimizing the multi-frame processing engine 411. The memory 415 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 415 may, in some examples, be considered a non-transitory storage medium. The term "non-transitory" may indicate that the non-transitory storage medium is not embodied in a carrier wave or a propagated signal. However, the term "non-transitory" should not be interpreted that the memory 415 is non-movable. In some examples, the memory 415 can be configured to store larger amounts of information. In certain examples, the non-transitory storage medium may store data that can, over time, change (e.g., in Random Access Memory (RAM) or cache). The memory 415 can be an internal storage unit, or it can be an external storage unit of the electronic device 401, a cloud storage, or any other type of external storage.

Figure 5:
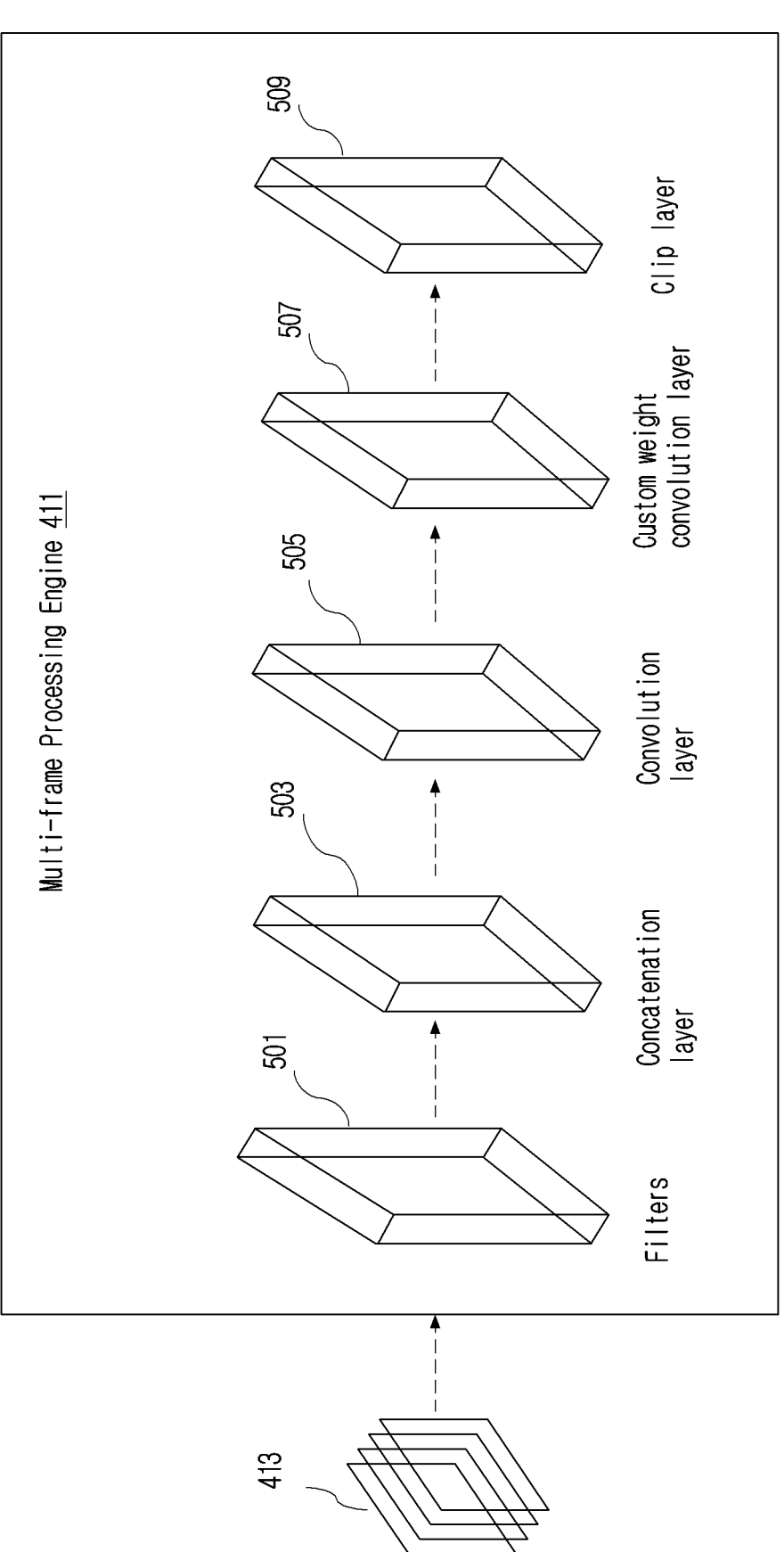
FIG. 5 illustrates a detailed architecture of the multi-frame processing model according to an embodiment.

The multi-frame processing engine 411 may be implemented in a neural network such as CNN, DNN, and/or RNN. FIG. 5 illustrates a detailed architecture of the multi-frame processing engine 411. The multi-frame processing engine 411 may include a plurality of predetermined filters 501, a plurality of convolution layers 505, a concatenation layer 503, a custom weight convolution layer 507, and a 509.

Tor the plurality of predetermined filters 501 a filter weight of each of the plurality of predetermined filters 501 may correspond to a dummy weight. The dummy weights may be alternatively referred to as custom weights or filter weights. Further, the plurality of predetermined filters 501 may be alternatively referred to as predetermined filters or filters without deviating from the scope of the disclosed embodiments. The dummy weight may be assigned to each of the plurality of predetermined filters 501 using a dummy weight interleaving method for preserving features in any of the frames. For example, consider a case where a first feature in a 2×2 block matrix of the input frames is required to be preserved. Accordingly, the dummy weights of the predetermined filters 501 are assigned as "1,0,0,0". That is to say, a corresponding filter weight of a corresponding filter whose feature is required to be preserved is assigned as "1" and the rest of the filters may be assigned as zero. Thus, when a value of the first feature is multiplied by the assigned dummy weight (i.e. '1), the corresponding first feature gets preserved. Further, for the rest of the features when multiplied with assigned dummy weights (i.e. 000), the corresponding features of the rest of the features in the 2×2 block matrix gets zero, hence not preserved.

The concatenation layer 503 may be configured to concatenate one or more frames. The frames may be either processed frames or unprocessed frames. For example, the frames such as raw frames, or original frames, that have not gone through any processing such as convolution or concatenation operations, may be referred to as unprocessed frames. Further, the frames that have gone through any processing like convolution, or any other operation, may be referred to as processed frames. The concatenation operation, performed by the concatenation layer 503, may be alternatively referred to as 'concat' or concat operation.

The plurality of convolution layers 505 may be configured to perform a convolution operation for the received plurality of input frames. The convolution operation, performed by the convolution layer 505, may be alternatively referred to as 'conv' or conv operation. As explained above, for preserving the features the convolution operation is performed using the filter weights. In a non-limiting example, the convolution operation may be performed by, for example, a stride convolution, a dilated convolution, a transposed convolution, and/or a grouped convolution. An explanation of the convolution operation is made with reference to the stride convolution. However, the disclosed methodology may be performed by any convolution operation. In general, the stride convolution is a type of convolution operation where a kernel is moved over an input feature map with a step size greater than one. This results in a downsampled output feature map compared to the input. The stride value determines how many pixels the kernel shifts in each direction during the convolution process. A stride convolution with the dummy weight interleaving method may be performed on the input frames. This operation preserves the width and the height while preserving an original information.

An additional convolution layer referred to herein as the custom weight convolution layer 507 may be implemented in the multi-frame processing engine 411.

The custom weight convolution layer 507 may be configured to determine a custom weight of the predetermined filter 501 and also a number of filters required in the custom weight convolution layer 507. Further, an additional convolution layer, referred to herein as the clip layer 509, is implemented in the multi-frame processing engine 411. The clip layer 509 may be implemented in order to eliminate the conventional preprocessing and post-processing step. Accordingly, the clip layer 509 is configured to limit one or more outputs of the processing engine 407 to a pre-determined range. The detailed operation of determination of the custom weight and operation of the clip layer is explained in the following paragraphs.

Referring back to FIG. 4, the output unit 409 may be configured to provide output processed by the processing engine 407.

A framework that converts the multi-frame processing model into a device-optimal multi-frame inference model through an auxiliary feedback loop may be provided. Accordingly, an output from the auxiliary feedback loop is provided as an input to an original multi-frame processing model which reduces computing time and power consumption. Detailed implementation and working will be explained in the forthcoming paragraphs.

Figure 7:
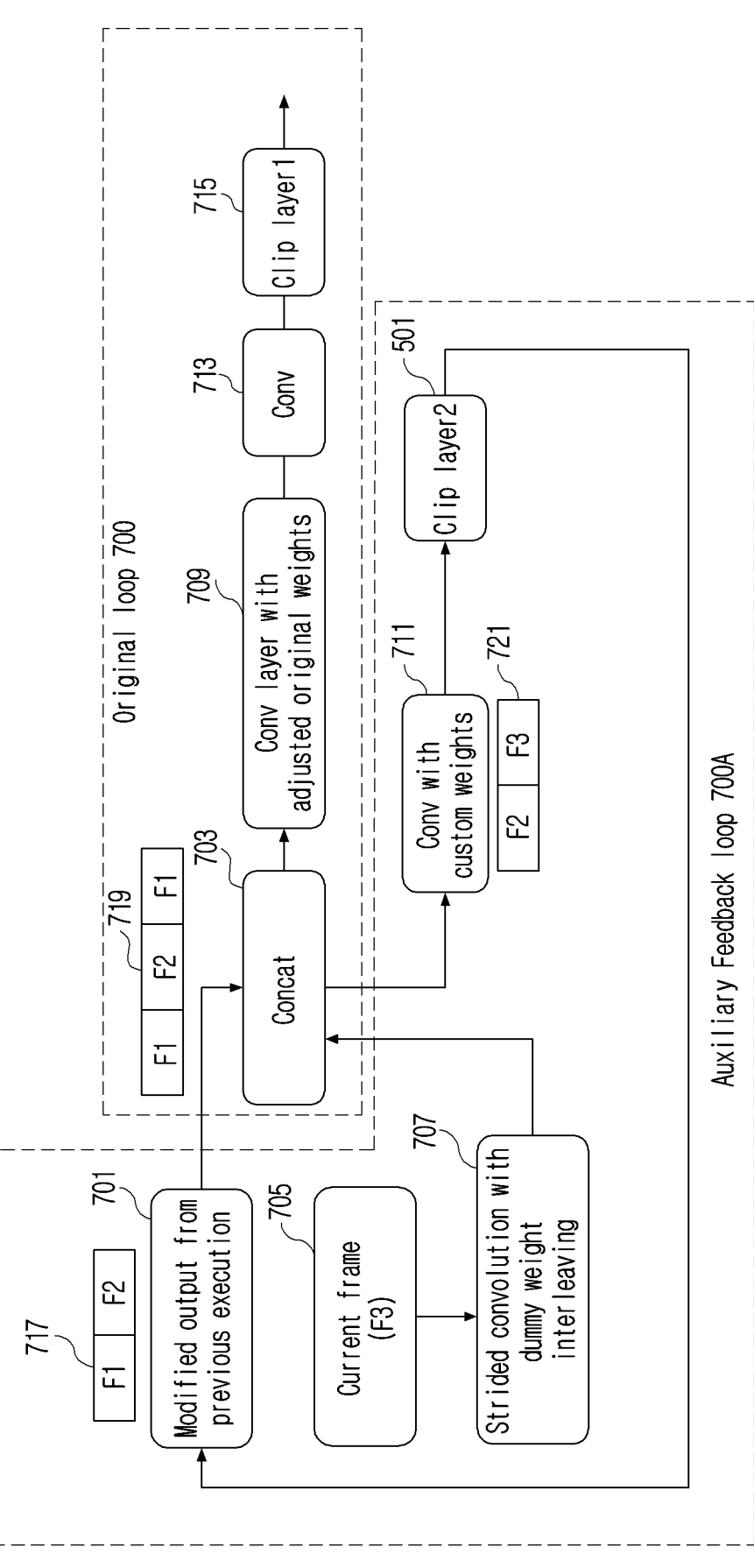
FIG. 7 illustrates an operational flow for optimizing the multi-frame processing model, according to an embodiment.

FIG. 6 illustrates a flow chart depicting a method 600 for optimizing the multi-frame processing model, according to an embodiment. The method 600 may be implemented at the electronic device 401. The method 600 is explained with reference to FIGS. 4-11. The method 600 may be implemented in any multi-frame processing model during offline mode to obtain a device-optimal model for inference. FIG. 7 illustrates an operational flow for optimizing the multi-frame processing model, according to an embodiment. Referring to FIG. 7, the auxiliary feedback loop 700A is added in an original loop 700 of the multi-frame processing engine 411. FIGS. 6 and 7 are described in conjunction with each other for the sake of brevity.

Initially, during the processing of images or video streams, the processing engine 407 may be configured to receive the plurality of the frames 413 as explained in FIGS. 4 and 5. As explained above in FIG. 5, generally, in the multi-frame inference model, for every processing cycle, a predetermined number of frames are selected for processing. Subsequently, after selecting the predetermined number of frames, the selected frames are processed in the original loop 700 of the multi-frame processing engine 411. For example, the predetermined number of frames are considered as three, according to the example embodiment as shown in FIG. 7. Accordingly, the selected frames undergo a first processing cycle through the original loop 700.

At step 601, the processing engine 407 may be configured to receive a first set of concatenated frames including a current input frame and a plurality of previously processed input frames. The plurality of previously processed input frames may be the frames that are modified and received from the previous execution or previous processing cycle or the first processing cycle after processing through the original loop 700. As an example, the first set of concatenated frames may be the frames that are processed from the predetermined number of frames. Further, the current input frame may be an incoming frame that is received by the processing engine 407 during each processing cycle of images or video. The current input frame may be alternatively referred to as the current frame.

The step 601 may be explained by referring to FIG. 7. As depicted in FIG. 7, at block 703, the concatenation layer 503 of the processing engine 407, may be configured to receive the first set of concatenated frames including the current input frame. In an example scenario, frame 1 and frame 2 are depicted as F1 and F2, respectively. The frames F1 and F2 may be the plurality of previously processed input frames 717 received by the concatenation layer 503 at the block 703. Further, the frame 3, depicted as F3, is the current frame at block 705 which is received by the concatenation layer 503 at the block 703. According to an example embodiment, the frames, i.e., the previously processed input frames and the current input frames are concatenated to output concatenated frames 719, i.e., F1, F2, and F3 are concatenated at the block 703. Thus, according to the given example, the first set of concatenated frames 719 are frames F1, F2, and F3 that are arranged as a sequence.

After, generating the first set of concatenated frames, at step 603, the multi-frame processing engine 411 of the processing engine 407, may be configured to generate a second set of concatenated frames by discarding a previously processed input frame that is oldest among the plurality of previously processed input frames, and is concatenated within the first set of concatenated frames. Referring to the same example scenario as considered above, in the step 603 a second set of concatenated frames 721 is generated by discarding the frame F1 which is the oldest among the plurality of previously processed input frames 717 and is concatenated within the first set of concatenated frames 719. As the frames are arranged in a sequence, the oldest frame in the sequence may be identified and discarded. Accordingly, the second set of concatenated frames may include the frames F2 and F3 in the sequence. In the example embodiment, only a single frame is shown to be removed or discarded. However, according to an alternate embodiment, more than one frame may be removed.

The generation of the second set of concatenated frames may include steps 603-1 and 603-2. Accordingly, for generating the second set of concatenated frames, the convolution operation may be performed by the plurality of convolution layers 505. In a non-limiting example, the stride convolution with the dummy weight interleaving method may be utilized for generating the second set of concatenated frames. An explanation of the dummy weight interleaving method using predetermined filters and filter weight to preserve the feature is explained in the above paragraphs and with reference to the FIG. 8. Therefore, for the sake of brevity, the detailed explanation is omitted here.

Accordingly, at step 603-1, the plurality of convolution layers 505, of the multi-frame processing engine 411 in the processing engine 407, are configured to perform one or more convolution operations on the first set of concatenated frames using one or more filters among the plurality of predetermined filters 501. Thereafter, at step 603-2, the plurality of convolution layers 505, of the multi-frame processing engine 411 in the processing engine 407, are configured to discard the previously processed input frame that is oldest among the plurality of previously processed input frames based on the performed one or more convolution operations. The convolution operations using the plurality of predetermined filters 501 are explained with reference to the example scenario depicted in FIG. 8.

Figure 8:
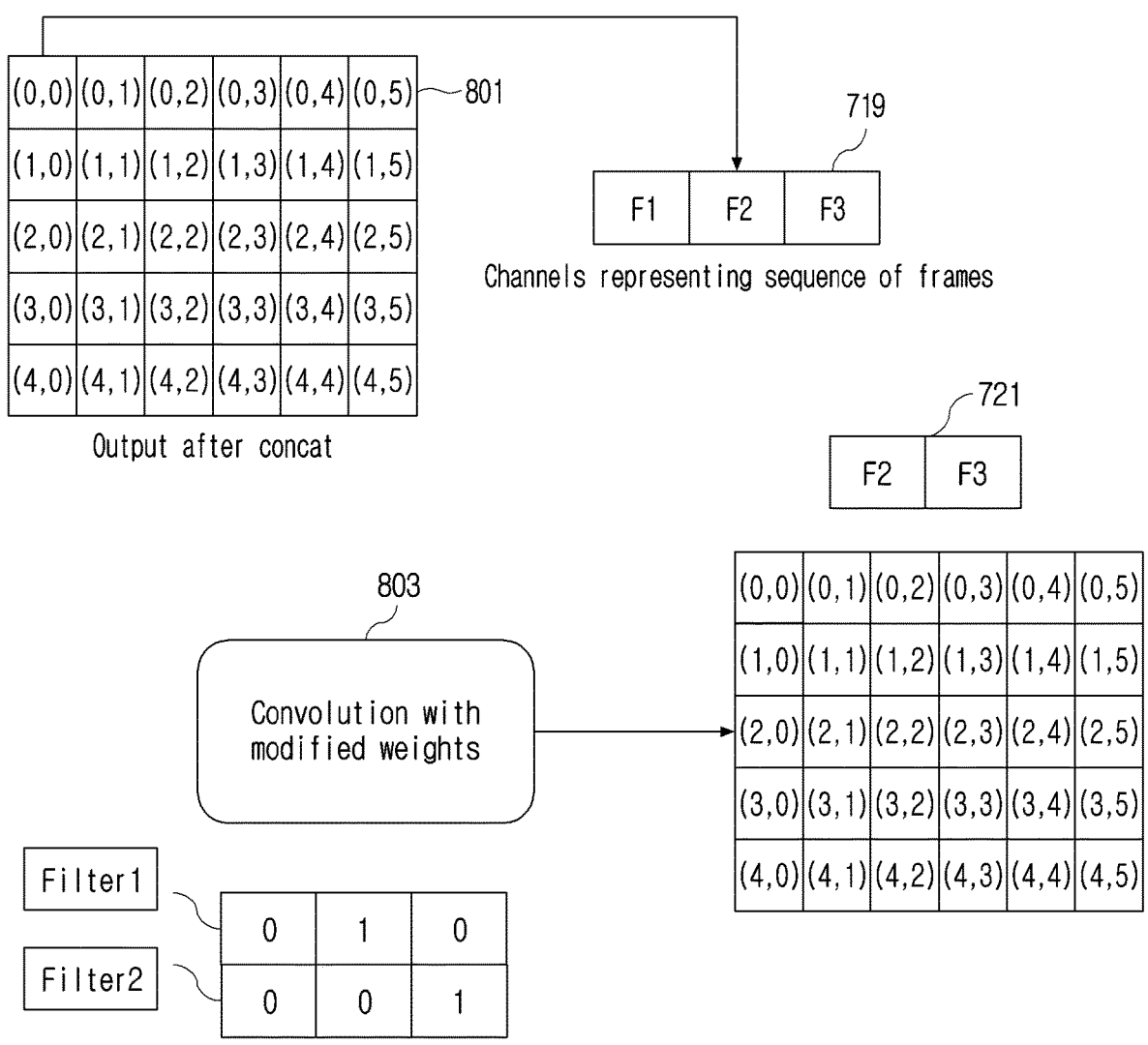
FIG. 8 illustrates an example scenario depicting convolution operations using a plurality of predetermined filters based on dummy weight interleaving method, according to an embodiment.

FIG. 8 illustrates an example scenario depicting the convolution operations using the plurality of predetermined filters based on the dummy weight interleaving method, according to an embodiment. In an example, an output of the concatenation operation 703 of the input frames is represented as a matrix 801. A stride convolution with the dummy weight interleaving method is performed on the matrix 801. The convolution operation is a multiplication of the input with the filter weights. Therefore, for example, if the input is "F1, F2, F3" and the filter is "0,1,0" then the output for this filter process is given by equation 1.

$$(F1*0)+(F2*1)+(F3*0)=F2 \qquad (1)$$

Accordingly, if the filter is "0,0,1" then the output is given by equation 2.

$$(F1*0)+(F2*0)+(F3*1)=F3 \qquad (2)$$

From the above equations, the filter weight is required to be set in order to retain the feature corresponding to the respective frames. Therefore, in the example scenario of FIG. 7, for removing or discarding the feature of the corresponding frame F1, the respective filter weight of F1 is set to zero and the respective filter weight of the frames F2 and F3 is set to 1. Accordingly, the filter weights for filter 1 and filter 2 correspond to (0,1,0) and (0,0,1).

FIG. 9 illustrates a flow diagram depicting a method 900 for setting the filter weight and the generation of the custom weight, according to an embodiment. The method 900 may be an operation flow for setting the filter weight for preserving the feature of the respective frames and generating the custom weight for a new output. The new output may refer to the output generated after discarding or removal of the oldest frames among the predetermined frames in the auxiliary feedback loop 700A. The method 900 may be implemented in the electronic device 401 of FIG. 4. Initially, at step 901, the processing engine 407 may be configured to determine the predetermined number of frames for processing by the plurality of convolution layers 505. The predetermined number of frames may be received as an input for inference. Thereafter, at step 903, the processing engine 407 is configured to determine the number of filters required in the custom weight convolution layer 507. The determination of the number of filters required in the custom weight convolution layer 507 is given by equation 3.

$$\begin{aligned}&\text{a number of filters required in the custom weight}\\&\quad\text{convolution layer=a number of previous frames}\\&\quad\text{required for processing}\qquad(3)\end{aligned}$$

At step 905, the processing engine may be configured to create a matrix of size 1*1*number of frames needed−1. The matrix hence created is depicted in the example of FIG. 8 at block 801. Thereafter, at step 907, the processing engine 407 may be configured to initialize the matrix with zeros. Then, at step 909, the processing engine 407 may be configured to determine whether the number of filters remaining is more than zero. Based on the determination as 'no', i.e., the number of filters remaining is not more than zero, at step 911, one or more weights for the custom weight convolution layer 507 for the new output are generated. The new output is the second set of concatenated frames which will be used for the next processing in conjunction with the next current input frame. The generated custom weights for the new output are then utilized for processing at block 711 of FIG. 7. Further, based on the determination as 'yes' i.e. the number of filters remaining is more than zero, at step 915, the processing engine 407 is configured to set the respective filter to 1. Then at step 913, the filter count is increased and the processing engine 407 again performs the step 909. Accordingly, the custom weight is assigned to the plurality of predetermined filters using the dummy weight interleaving method.

The generated second set of concatenated frames and the current input frame may be downsampled. FIG. 10 illustrates a custom kernel generation method 1000 for downsampling the generated second set of concatenated frames and the current input frame, according to an embodiment. The method 1000 may be an operation flow for a custom kernel generation for downsampling the generated second set of concatenated frames and the current input frame. The downsampling may be a method to reduce a resolution of the frame to a lower resolution. The method 1000 is implemented in the electronic device 401 of FIG. 4. Initially, at step 1001, the processing engine 407 may be configured to determine a required reduction in the dimension of the second set of concatenated frames and the current frame to a specific resolution. As an example, the requirement of the reduction is based on the model complexity. Based on the determination, at step 1003, the processing engine 407 may be configured to compute a kernel shape. In a non-limiting example, the kernel shape, the number of filters, and a stride required for convolution are determined. The equations for the kernel shape, the number of filters, and the stride are provided below:

$$\text{Kernel shape}=\text{reduction scale}*\text{reduction scale} \quad (4)$$

$$\text{Number of filters}=\text{reduction scale}\times\text{reduction scale} \quad (5)$$

$$\text{Stride}=\text{reduction scale} \quad (6)$$

In a non-limiting example, consider that the required reduction in the dimension is two. Then based on the equations 4, 5, and 6 the kernel shape, the number of filters, and stride are found to be as below:

$$\text{Kernel shape}=2*2(\text{read as, 2 by 2})$$

$$\text{Number of filters}=2\times2=4$$

$$\text{Stride}=2$$

Thereafter, at step 1005, the processing engine 407 may be configured to initialize the filter weights with zero. Since few positions will have values, the rest will be dummies interleaved with zeros, hence initial values are initialized to zeros. At step 1007, the processing engine 407 may be configured to determine whether the number of remaining filters is greater than zero. The determination of whether the number of remaining filters is greater than zero is performed based on equation 3. Thus, based on the determination as 'yes', i.e., the number of remaining filters is greater than zero, at step 1009 the filter weights are set. Accordingly, the reshaped kernel weights at step 1010 are provided for the convolution operation to the custom weight convolution layer 507 when the number of remaining filters is not greater than zero. The reshaped kernel weight is given to block 707 of FIG. 7 for further processing. Accordingly, at step 1111, a filter count is increased.

The processing engine 407 may be configured to generate a third set of concatenated frames by concatenating the down-sampled current input frame and the down-sampled second set of concatenated frames at block 703. The third set of concatenated frames is further processed through the original loop 700 to provide the output.

Referring back to FIG. 6, after performing various operations at step 603, the method 600, at step 605, further includes providing the second set of concatenated frames to the multi-frame processing model 411 for concatenating the second set of concatenated frames with a next receiving input frame. Accordingly, the new output that was generated as the second set of concatenated frames is provided as an input for the next processing cycle. Thus, the new output act as an auxiliary feedback output that preserves the data while dropping the dimension. This auxiliary feedback output eliminates redundant processing as present in the conventional solutions. Referring to FIG. 7, the second set of concatenated frames F2 and F3 is provided to the block 701 for utilizing it for the next processing cycle. Further, a new input frame, for example, frame F4 (not shown) then becomes the current frame. The rest of the procedure remains the same as explained above.

The processing engine 407 may be configured to adjust a weight of the convolution layer of the plurality of convolution layers 505 that receives the first set of concatenated frames based on a change in the specific resolution and an input channel. Referring to FIG. 7, at the block 709, the convolution layer with adjusted original weight is provided to a next convolution layer 713. As the previous frame and the current frames at block 705 are downsampled, the weights of the plurality of convolution layers 505 are required to be adjusted in the subsequent operation. Therefore, based on a required specific resolution and the input channels, the weights are adjusted for the successive operation.

A clip layer 509 may be provided at an output stage in order to eliminate the need for pre-processing and post-processing steps. Referring to FIG. 7, a clip layer 1 715 is provided at the output of the original loop 700, and a clip layer 2 501 is provided at the auxiliary feedback loop 700A. Accordingly, the processing engine 407 may be configured to determine a clipping range of the clipping layer based on a bit depth and an input range associated with one or more input frames within the second set of concatenated frames. In particular, while determining the clip layer range, a value of input or output and the bit depth is considered. In case the value range and bit depth are different, the custom quantization values can be used to adjust bias and scale. Further, the processing engine 407 may be further configured to limit one or more outputs of the processing engine to a predetermined range based on the determined clipping range of the clipping layer. For example, if the input range is from −10 to 200 and the input frame bit depth is 8 bits, i.e., a max number of levels is 256, then the clip min and max range is 0 and 255 respectively.

FIG. 11 illustrates a flow chart for optimizing the multi-frame processing model, according to an embodiment. FIG. 11 depicts a method 1111 implemented at the electronic device 401, according to some embodiments. The method 1111 is analogous to method 600 of FIG. 6, therefore for the sake of brevity, a detailed explanation of the same is omitted here. Further, the explanation of the methods as depicted in FIGS. 5-10 is also applicable in method 1111. At step 1101 the processing engine 404 may be configured to receive plurality of input frames. Thereafter, at step 1103, the processing engine 407 may be configured to select the pre-determined number of frames from the received plurality of frames for processing by the plurality of convolution layers 505. After that, at step 1105, the processing engine 407 may be configured to determine, as the sequence of frames, at least a preceding frame and a plurality of following frames amongst the selected pre-determined number of frames. Here the preceding frame is the oldest frame. After that, at step 1107, the processing engine 407 may be configured to remove or discard the preceding frame by processing the sequence of frames using the plurality of filters in the multi-frame processing model 411. Thereafter, at step 1109, the processing engine 407 may be configured to concatenate the plurality of following frames, other than the preceding frames, in a sequence, to the plurality of input frames for subsequent receiving into the multi-frame processing model 411.

FIG. 12 illustrates a conversion of an original multi-frame processing model to device optimized model using the method of FIG. 6, according to an embodiment. Initially, an original multi-frame processing model which is pre-trained is considered as a starting point for the multi-frame processing. The frames may be concatenated at block 1201 and weights are adjusted based on the dummy weight interleaving method to preserve the output at block 1203. The process at blocks 1201 and 1203 is performed at the original loop 700 as shown in FIG. 7. This may be considered as the first processing cycle. The output quality of the original loop 700 is checked at 1205 with respect to a desired output quality. If the output is of the desired output quality, then the same weights and parameters are provided to the auxiliary feedback loop 700A of FIG. 7 for further processing. That is to say, at block 1209, the multi-frame processing engine 411 adds the auxiliary feedback loop 700A for custom output with the same weights and parameters that is to be utilized in the next processing cycle. If the output is not of the desired output quality, then the multi-frame processing engine is then trained with the new operation for further processing through the auxiliary feedback loop 700A to generate a device-optimized model.

The disclosed methodology eliminates the redundant processing of input frames based on the application of discarding of the oldest frames. Further, by adding clip layers at the output further eliminates the computation of post-processing.

Unless otherwise defined, all technical and scientific terms used herein have the same meaning as commonly understood by one ordinary skilled in the art. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for optimizing multi-frame processing model of a neural network, the method comprising: receiving a first set of concatenated frames and a plurality of previously processed input frames by a processing engine that is configured to execute a multi frame processing model, the first set of concatenated frames including a current input frame; generating a second set of concatenated frames by discarding an oldest previously processed input frame of the plurality of previously processed input frames that is concatenated within the first set of concatenated frames; and providing the second set of concatenated frames to the multi frame processing model for concatenating the second set of concatenated frames with the current input frame, so that the multi frame processing model is optimized by eliminating processing of the discarded oldest previously processed input frame.

2. The method as claimed in claim 1, wherein the multi frame processing model includes a plurality of predetermined filters, and wherein the generating the second set of concatenated frames comprises: performing one or more convolution operations on the first set of concatenated frames using one or more filters of the plurality of predetermined filters; and discarding the oldest previously processed input frame based on a result of the performing the one or more convolution operations.

3. The method as claimed in claim 2, wherein the one or more convolution operations is performed using all of the plurality of predetermined filters.

4. The method as claimed in claim 2, wherein a filter weight of each of the plurality of predetermined filters corresponds to a dummy weight, and wherein the dummy weight is associated with each of the plurality of predetermined filters via a dummy weight interleaving method.

5. The method as claimed in claim 2, further comprising: downsampling the current input frame and each of the second set of concatenated frames to a specific resolution; and generating a third set of concatenated frames by concatenating the down sampled current input frame and the down sampled second set of concatenated frames.

6. The method as claimed in claim 5, wherein the downsampling the current input frame to the specific resolution comprises performing a convolution on the current input frame using a filter weight of the one or more filters.

7. The method as claimed in claim 5, wherein the multi frame processing model further includes a plurality of convolution layers, and wherein the method further comprises adjusting a weight of a convolution layer of the plurality of convolution layers that receives the first set of concatenated frames based on a change in the specific resolution and a change in an input channel.

8. The method as claimed in claim 1, wherein the multi frame processing model includes a clipping layer, and wherein the method further comprises: determining a clipping range of the clipping layer based on a bit depth and an input range associated with one or more input frames within the second set of concatenated frames; and limiting one or more outputs of the processing engine to a pre-determined range based on the determined clipping range of the clipping layer.

9. The method as claimed in claim 1, wherein the processing engine is a component of the neural network that is at least one of a recurrent neural network (RNN), a convolutional neural network (CNN), or a deep neural networks (DNN).

10. An apparatus for optimizing multi-frame processing model of a neural network, the apparatus comprising: a processing engine that is configured to execute a multi frame processing model, the processing engine being further configured to: receive a first set of concatenated frames and a plurality of previously processed input frames, the first set of concatenated frames including a current input frame; generate a second set of concatenated frames by discarding an oldest previously processed input frame of the plurality of previously processed input frames that is concatenated within the first set of concatenated frames; and provide the second set of concatenated frames to the multi frame processing model for concatenating the second set of concatenated frames with the current input frame, so that the multi frame processing model is optimized by eliminating processing of the discarded oldest previously processed input frame.

11. The apparatus as claimed in claim 10,
wherein the multi frame processing model includes a plurality of predetermined filters, and
wherein the processing engine being configured to generate the second set of concatenated frames includes being configured to:
perform one or more convolution operations on the first set of concatenated frames using one or more filters of the plurality of predetermined filters; and
discard the oldest previously processed input frame based on a result of the performed one or more convolution operations.

12. The apparatus as claimed in claim 11, wherein the one or more convolution operations is performed using all of the plurality of predetermined filters.

13. The apparatus as claimed in claim 11,
wherein a filter weight of each of the plurality of predetermined filters corresponds to a dummy weight, and
wherein the dummy weight is associated with each of the plurality of predetermined filters via a dummy weight interleaving method.

14. The apparatus as claimed in claim 11, wherein the processing engine is further configured to:

downsample the current input frame and each of the second set of concatenated frames to a specific resolution; and
generate a third set of concatenated frames by concatenating the down sampled current input frame and the down sampled second set of concatenated frames.

15. The apparatus as claimed in claim 14, wherein the processing engine being configured to downsample the current input frame to the specific resolution includes being configured to perform a convolution on the current input frame using a filter weight of the one or more filters.

16. The apparatus as claimed in claim 14,
wherein the multi frame processing model further includes a plurality of convolution layers, and
wherein the processing engine is further configured to adjust a weight of a convolution layer of the plurality of convolution layers that receives the first set of concatenated frames based on a change in the specific resolution and a change in an input channel.

17. The apparatus as claimed in claim 11,
wherein the multi frame processing model includes a clipping layer, and
wherein the processing engine is further configured to:
determine a clipping range of the clipping layer based on a bit depth and an input range associated with one or more input frames within the second set of concatenated frames; and
limit one or more outputs of the processing engine to a pre-determined range based on the determined clipping range of the clipping layer.

18. The apparatus as claimed in claim 10, wherein the processing engine is a component of the neural network that is at least one of a recurrent neural network (RNN), a convolutional neural network (CNN), or a deep neural networks (DNN).

* * * * *